United States Patent
Fujimaki (10) Patent No.: US 11,334,957 B2
(45) Date of Patent: May 17, 2022

(54) INFORMATION PROCESSING SYSTEM, RELAY DEVICE, AND NON-TRANSITORY COMPUTER READABLE MEDIUM STORING PROGRAM

(71) Applicant: FUJIFILM Business Innovation Corp., Tokyo (JP)

(72) Inventor: Yoshihiro Fujimaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 403 days.

(21) Appl. No.: 16/211,195

(22) Filed: Dec. 5, 2018

(65) Prior Publication Data
US 2019/0272603 A1 Sep. 5, 2019

(30) Foreign Application Priority Data
Mar. 2, 2018 (JP) .............................. JP2018-037793

(51) Int. Cl.
*G06Q 50/14* (2012.01)
*G06Q 50/12* (2012.01)
*G06Q 10/02* (2012.01)

(52) U.S. Cl.
CPC ............. *G06Q 50/14* (2013.01); *G06Q 10/02* (2013.01); *G06Q 50/12* (2013.01)

(58) Field of Classification Search
CPC ......... G06Q 50/14; G06Q 10/02; G06Q 50/12
See application file for complete search history.

(56) References Cited

U.S. PATENT DOCUMENTS 9,210,155 B2 * 12/2015 Amaro ................... H04L 67/141
9,697,517 B1 * 7/2017 Chambers .............. G06Q 20/24
(Continued)

FOREIGN PATENT DOCUMENTS

JP 2002056193 2/2002
JP 2003331045 11/2003
(Continued)

OTHER PUBLICATIONS

Han, Zhu, and Sun, Yan Lindsay, "Distributed Cooperative Transmission with Unreliable and Untrustworthy Relay Channels," EURASIP Journal on Wireless Communications and Networking, 2009, pp. 1-13.*

(Continued)

*Primary Examiner* — Nathan Erb
(74) *Attorney, Agent, or Firm* — JCIPRNET (57) ABSTRACT

An information processing system includes an information processing apparatus that performs a received processing request; a relay device that relays the processing request performed by the information processing apparatus; and a user terminal that transmits the processing request to the relay device, wherein the relay device transmits the received processing request to the information processing apparatus capable of performing the processing request in a case of receiving the processing request from the user terminal, and designates a transmission destination of deficiency information and transmits the designated transmission destination to the user terminal in a case where there is the deficiency information which is not possible to be acquired in the relay device among pieces of information required for performing the processing request, and the user terminal transmits the deficiency information to the transmission destination designated by the relay device.

18 Claims, 11 Drawing Sheets

(56) References Cited

U.S. PATENT DOCUMENTS

| | | | |
|---|---|---|---|
| 9,953,305 B2* | 4/2018 | Guedj | G06Q 20/12 |
| 10,878,511 B1* | 12/2020 | Allen | G06Q 20/351 |
| 2003/0214775 A1 | 11/2003 | Fukuta et al. | |
| 2005/0071239 A1* | 3/2005 | Tormey | G06Q 30/06 705/26.43 |
| 2005/0154620 A1* | 7/2005 | Hentschel | G06Q 10/025 705/5 |
| 2006/0229958 A1* | 10/2006 | Sergio | G06Q 10/10 705/35 |
| 2006/0294023 A1* | 12/2006 | Lu | G06Q 30/06 705/67 |
| 2007/0038765 A1* | 2/2007 | Dunn | G06F 21/6218 709/229 |
| 2011/0119732 A1* | 5/2011 | Dunn | H04L 63/102 726/1 |
| 2011/0258123 A1* | 10/2011 | Dawkins | G06Q 20/40 705/75 |
| 2013/0151291 A1* | 6/2013 | Salway | G06Q 10/02 705/5 |
| 2013/0238371 A1* | 9/2013 | You | G06Q 10/02 705/5 |
| 2014/0070001 A1* | 3/2014 | Sanchez | G06Q 40/025 235/380 |
| 2014/0195604 A1* | 7/2014 | Wyatt | H04W 4/60 709/203 |
| 2015/0149765 A1* | 5/2015 | Pauliac | H04W 12/033 713/153 |
| 2015/0371157 A1* | 12/2015 | Jaffe | G06Q 10/1097 705/6 |
| 2016/0140543 A1* | 5/2016 | Steiger | H04L 63/04 705/39 |
| 2016/0321636 A1* | 11/2016 | Huh | G06Q 20/322 |
| 2018/0047021 A1* | 2/2018 | Uppalapati | G06Q 20/12 |
| 2018/0322493 A1* | 11/2018 | Royyuru | G06Q 20/12 |
| 2021/0064967 A1* | 3/2021 | Nosko | G06N 3/0454 |

FOREIGN PATENT DOCUMENTS

| | | |
|---|---|---|
| JP | 2006338486 | 12/2006 |
| JP | 2009075666 | 4/2009 |

OTHER PUBLICATIONS

"Office Action of Japan Counterpart Application", dated Jan. 25, 2022, with English translation thereof, p. 1-p. 6.

* cited by examiner

ACCESS PERMISSION LIST host:port=HostA:port A
host:port=HostB:port B
filePath=c:¥temp

.
.
.

http://www.aaa.bbb.com
http://www.rstu.vwxyz.jp

INFORMATION PROCESSING SYSTEM, RELAY DEVICE, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-037793 filed Mar. 2, 2018.

BACKGROUND (i) Technical Field

The present invention relates to an information processing system, a relay device, and a non-transitory computer readable medium storing a program.

(ii) Related Art

JP2009-075666A discloses a service cooperation device that converts user data input by a user on an input screen into conversion data, transmits the conversion data to a service providing device, converts conversion data included in service result data from the service providing device into the original user data again, and displays the user data which has been converted again.

SUMMARY

Aspects of non-limiting embodiments of the present disclosure relate to an information processing system, a relay device, and a non-transitory computer readable recording medium storing a program in which the relay device acquires all kinds of information required for performing a processing request, and thus it is possible to reduce a communication volume in comparison to a case of transmitting pieces of information to the information processing apparatus for performing the processing request.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing system including an information processing apparatus that performs a received processing request; a relay device that relays the processing request performed by the information processing apparatus; and a user terminal that transmits the processing request to the relay device, wherein the relay device transmits the received processing request to the information processing apparatus capable of performing the processing request in a case of receiving the processing request from the user terminal, and designates a transmission destination of deficiency information and transmits the designated transmission destination to the user terminal in a case where there is the deficiency information which is not possible to be acquired in the relay device among pieces of information required for performing the processing request, and the user terminal transmits the deficiency information to the transmission destination designated by the relay device

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the drawings.

Figure 1:
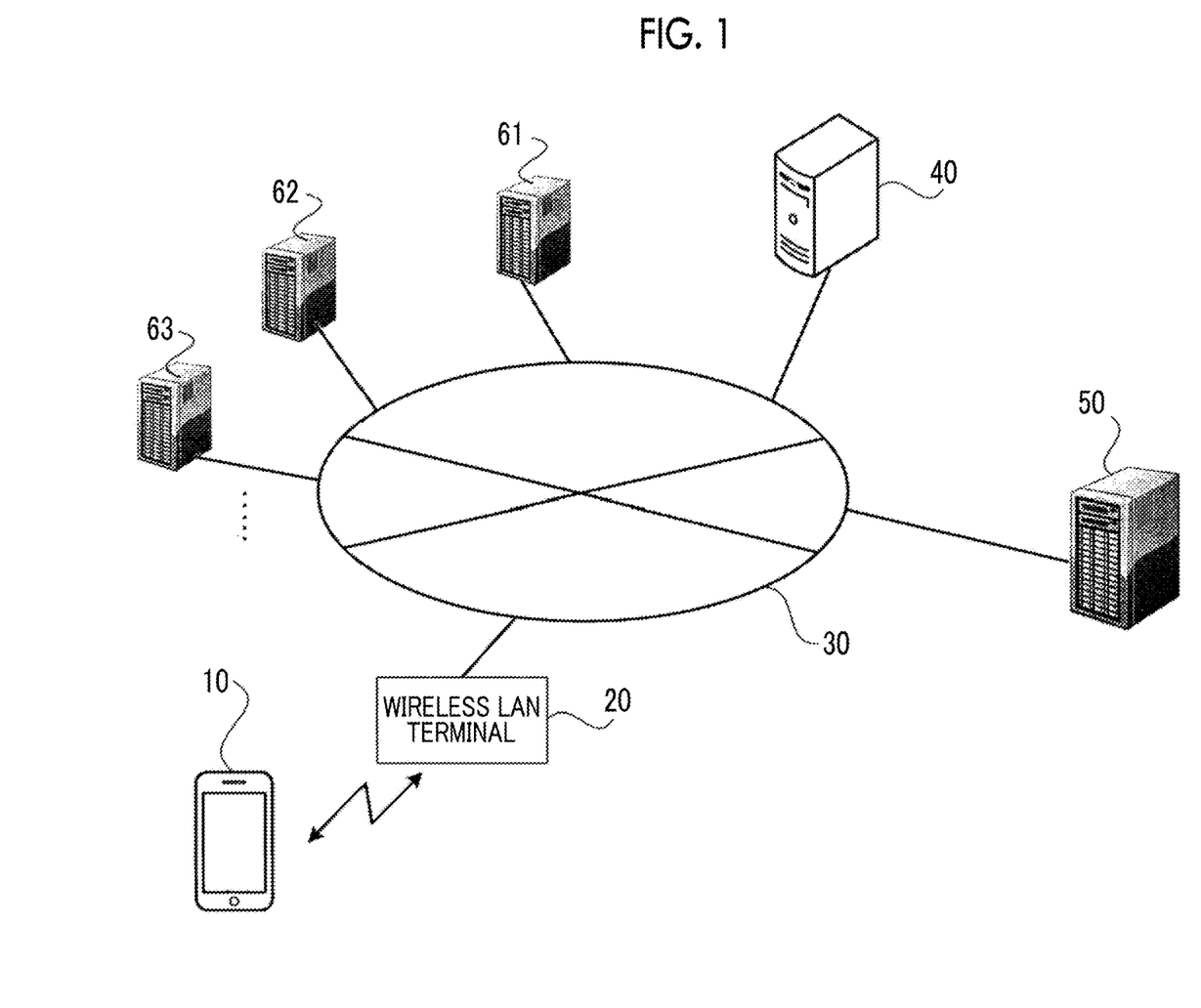
FIG. 1 is a diagram illustrating a system configuration of a travel reservation system according to an exemplary embodiment of the present invention.

FIG. 1 is a diagram illustrating a system configuration of a travel reservation system according to an exemplary embodiment of the present invention.

As illustrated in FIG. 1, the travel reservation system in the exemplary embodiment of the present invention includes a user terminal 10, a travel reservation server 40, a social networking service (SNS) server 50, a hotel-A reservation server 61, a hotel-B reservation server 62, a flight ticket reservation server 63, and the like which are connected to each other by the Internet 30.

The hotel-A reservation server 61, the hotel-B reservation server 62, and the flight ticket reservation server 63 are information processing apparatuses that perform kinds of processing such as reservation of Hotel A, reservation of Hotel B, and reservation of a flight ticket based on reservation requests (processing requests) which have been transmitted, respectively.

The travel reservation server 40 is a relay device that relays a reservation request performed by the hotel-A reservation server 61, the hotel-B reservation server 62, the flight ticket reservation server 63, or the like. The travel reservation server is a server that provides a travel reservation service of receiving a reservation of a travel from the user terminal 10 by deputizing reservation of a hotel, reservation of a train ticket, a flight ticket, or the like.

The user terminal 10 includes a function of being capable of connection to the Internet 30 via a wireless LAN terminal 20 or the like. The user terminal is a device such as a smart phone, a tablet terminal, and a notebook personal computer, which is held by a user. The user terminal 10 has a function of being capable of reserving a travel by transmitting a reservation request to the travel reservation server 40.

The SNS server 50 is a server that provides a social networking service (SNS) such as Facebook (registered trademark) and Twitter (registered trademark) to a user. The SNS server 50 is an information storing device that stores various kinds of user information regarding an e-mail address, the name, the age, the date of birth, the address, and the like of each user.

Various kinds of user information stored in the SNS server 50 can be known by a user inputting information of an ID, a password, or the like so as to perform log-in, and a person other than the user is not capable of knowing the above information.

However, in a case where the user accesses the SNS server 50, the SNS server 50 issues an access token based on the OAuth2.0 protocol, for example, and then the user transmits the access token to the travel reservation server 40, and the travel reservation server 40 presents the access token to the SNS server 50, user information of the user can be acquired. That is, the access token refers to information for proving that the user permits acquiring of user information.

The user transmits the access token acquired from the user terminal 10 to the travel reservation server 40, and thus it is possible to save the labor of registering user information of the user stored in the SNS server 50 in the travel reservation server 40 again.

Figure 2:
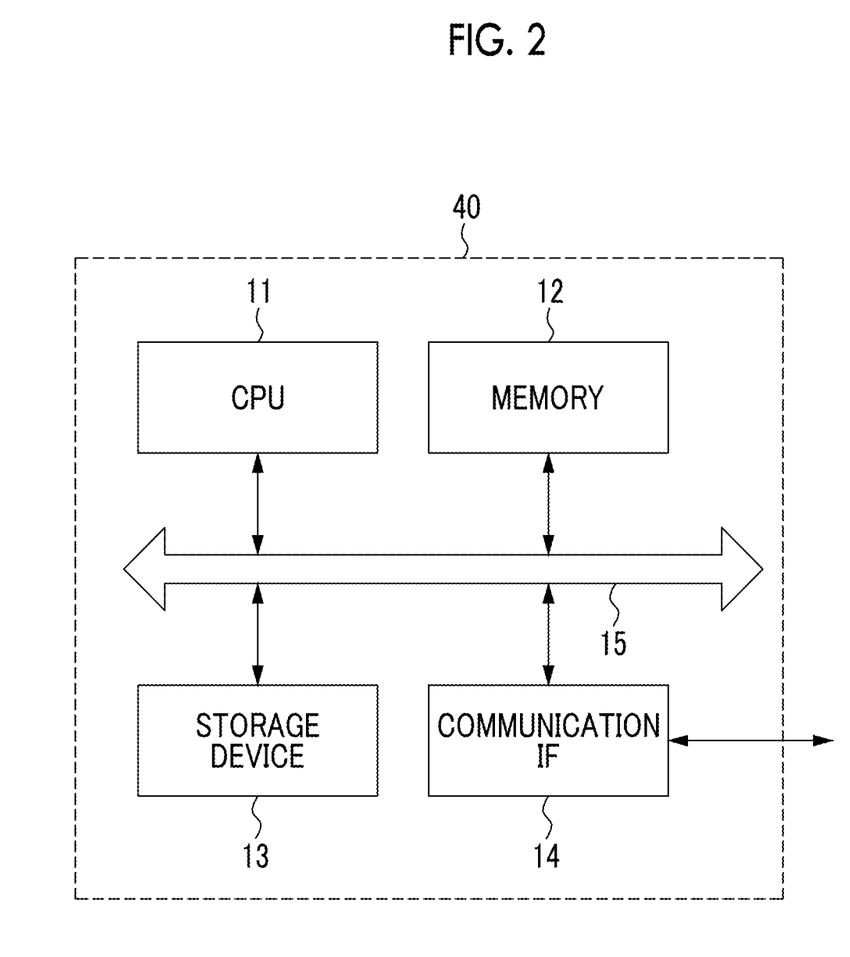
FIG. 2 is a block diagram illustrating a hardware configuration of a travel reservation server 40 in the exemplary embodiment of the present invention.

Next, FIG. 2 illustrates a hardware configuration of the travel reservation server 40 in the travel reservation system in the exemplary embodiment.

As illustrated in FIG. 2, the travel reservation server 40 includes a CPU 11, a memory 12, a storage device 13 such as a hard disk drive (HDD), and a communication interface (IF) 14 that transmits and receives data to and from an external device and the like via the Internet 30. The components are connected to each other via a control bus 15.

The CPU 11 performs predetermined processing based on a control program stored in the memory 12 or the storage device 13 so as to control an operation of the travel reservation server 40. In the exemplary embodiment, descriptions will be made on the assumption that the CPU 11 reads and executes the control program stored in the memory 12 or the storage device 13. However, the program may be stored in a storage medium such as a CD-ROM and may be provided to the CPU 11.

Figure 3:
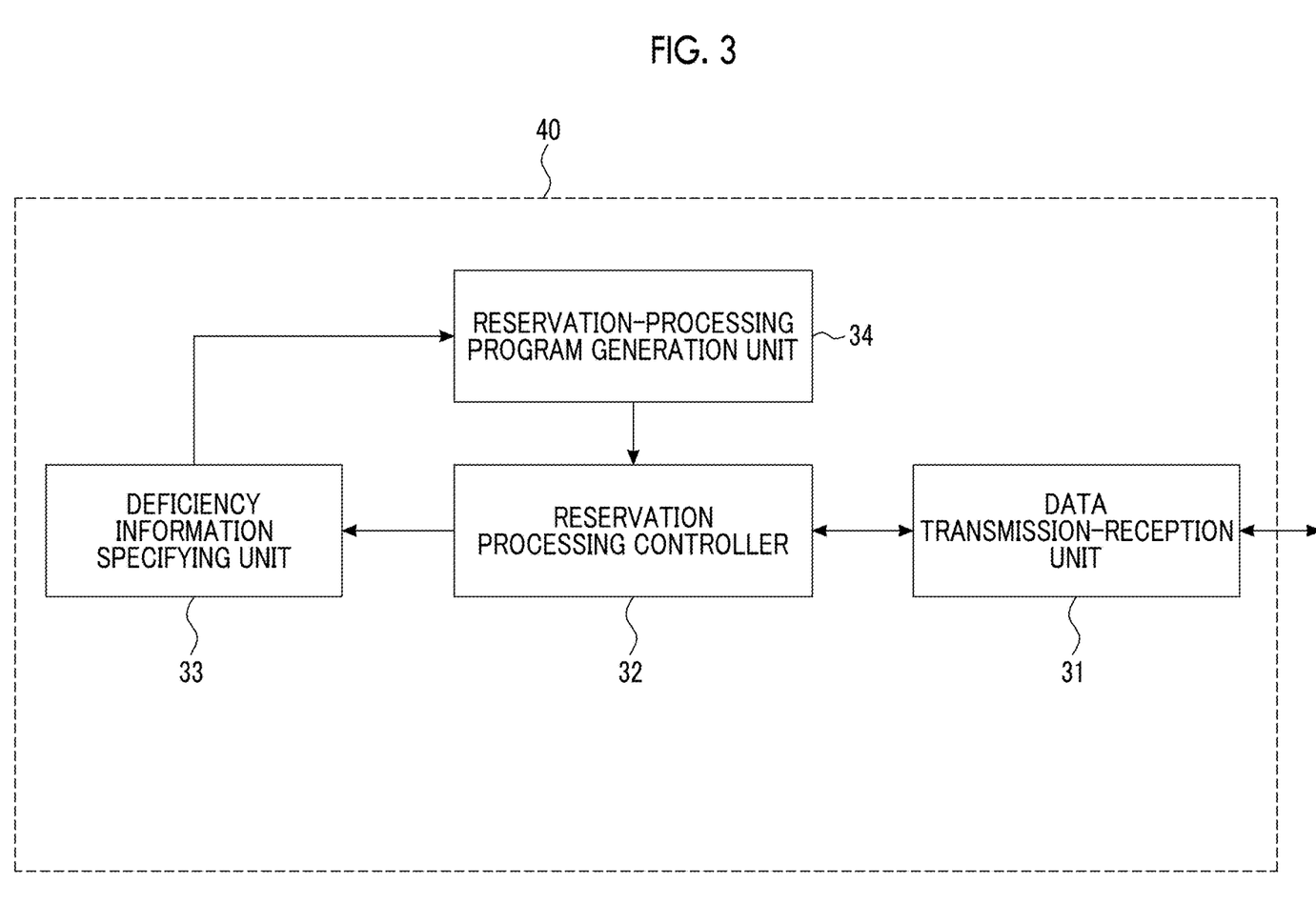
FIG. 3 is a block diagram illustrating a functional configuration of the travel reservation server 40 in the exemplary embodiment of the present invention.

FIG. 3 is a block diagram illustrating a functional configuration of the travel reservation server 40, which is realized by executing the control program.

As illustrated in FIG. 3, the travel reservation server 40 in the exemplary embodiment includes a data transmission-reception unit 31, a reservation processing control unit 32, a deficiency-information specifying unit 33, and a reservation-processing program generation unit 34.

The data transmission-reception unit 31 transmits and receives data to and from other devices such as the user terminal 10, the SNS server 50, the hotel-A reservation server 61, the hotel-B reservation server 62, and the flight ticket reservation server 63.

The reservation processing control unit 32 performs reservation processing for performing the received travel reservation request in a case where the reservation processing controller receives the travel reservation request (processing request) from the user terminal 10 via the data transmission-reception unit 31. In the following descriptions, one travel reservation request includes plural reservation requests (bunch of processing requests) such as reservation of Hotel A, reservation of Hotel B, and reservation of a flight ticket. Therefore, the reservation processing control unit 32 firstly recognizes that the travel reservation request (bunch of processing requests) from the user terminal 10 includes the reservation of Hotel A, reservation of Hotel B, and reservation of a flight ticket. In this state, the reservation processing control unit 32 assigns the reservation requests to the corresponding destinations in order to perform the reservation requests, respectively. Specifically, the reservation processing control unit 32 assigns the received travel reservation request (bunch of processing requests), and transmits the reservation request of Hotel A to the hotel-A reservation server 61, transmits the reservation request of Hotel B to the hotel-B reservation server 62, and transmits the reservation request of a flight ticket to the flight ticket reservation server 63.

Descriptions will be made below on the assumption as follows. The travel reservation request from the user terminal 10 includes information indicating that the destination of the reservation request of Hotel A is the hotel-A reservation server 61. The reservation processing control unit 32 transmits the reservation request of Hotel A based on destination information included in the travel reservation request. However, the reservation processing control unit 32 may not transmit the reservation request to the corresponding destination indicated by the destination information included in the travel reservation request, but transmit the reservation request to a destination which has been appropriately selected.

The reservation processing control unit 32 acquires information regarding the type of information required for performing reservation processing, from the hotel-A reservation server 61, the hotel-B reservation server 62, the flight ticket reservation server 63, and the like. For example, the reservation processing control unit 32 receives a message that the name, the address, the contact point of a reserver, credit card information of a credit card number and the like, information of reservation date and the like are required as information required for the reservation processing.

In a case where the reservation processing controller receives such a message, the deficiency-information specifying unit 33 compares user information held in the travel reservation server or user information capable of being acquired from the SNS server 50 to the information which is required for the reservation processing and has been required from the hotel-A reservation server 61, the hotel-B reservation server 62, the flight ticket reservation server 63, and the like. As a result, the deficiency-information specifying unit specifies deficiency information which is not possible to be acquired by the travel reservation server among pieces of information required for performing the reservation processing.

In a case where the deficiency-information specifying unit specifies the deficiency information, the reservation-processing program generation unit 34 receives an input of such deficiency information from the user. The reservation-processing program generation unit generates a reservation processing program (processing program) of transmitting the deficiency information to the hotel-A reservation server 61, the hotel-B reservation server 62, and the flight ticket reservation server 63 and causing the reservation processing to be performed.

The reservation processing program is a program of acquiring the deficiency information and causing the reservation server such as the hotel-A reservation server 61, the hotel-B reservation server 62, and the flight ticket reservation server 63 to perform the reservation processing. The reservation processing control unit 32 designates a transmission destination of the deficiency information which is not possible to be acquired by the travel reservation server among the pieces of information required for performing the reservation processing and transmits the designated transmission destination to the user terminal 10, in a manner that the reservation processing controller transmits the reservation processing program generated by the reservation-processing program generation unit 34 to the user terminal 10 via the data transmission-reception unit 31.

The reservation processing program is generated based on information indicating the type of deficiency information and information of the transmission destination for transmitting the deficiency information. Therefore, the reservation processing program is executed by the user terminal 10 so as to acquire the deficiency information and transmit the acquired deficiency information to the preset transmission destination. The reservation processing program may acquire the deficiency information by receiving an input of the deficiency information from a user or by reading information which has been stored in the user terminal 10 in advance.

With such a configuration, in a case where the travel reservation server receives a travel reservation request from the user terminal 10, the travel reservation server 40 transmits the received travel reservation request to the information processing apparatus capable of performing the reservation request, such as the hotel-A reservation server 61, the hotel-B reservation server 62, and the flight ticket reservation server 63. In a case where there is deficiency information which is not possible to be acquired in the travel reservation server among pieces of information required for performing the reservation request, the travel reservation server designates a transmission destination of the deficiency information and transmits the designated transmission destination to the user terminal 10.

Specifically, the travel reservation server 40 designates a transmission destination and transmits the designated transmission destination to the user terminal 10 such that deficiency information among pieces of information required for reservation processing for Hotel A is transmitted to the hotel-A reservation server 61. Similarly, the travel reservation server 40 designates transmission destinations and transmits the designated transmission destinations to the user terminal 10 such that deficiency information among pieces of information required for reservation processing for Hotel B is transmitted to the hotel-B reservation server 62, and deficiency information among pieces of information required for reservation processing for a flight ticket is transmitted to the flight ticket reservation server 63.

The user terminal 10 transmits the deficiency information to the transmission destination designated by the travel reservation server 40.

The travel reservation server 40 has stored the type of information which is not possible to be acquired by the travel reservation server in advance. In a case where the travel reservation server receives information regarding the type of information required for performing the reservation processing from the reservation server such as the hotel-A reservation server 61, the hotel-B reservation server 62, and the flight ticket reservation server 63, in a case where there is information of the type which is not possible to be acquired by the travel reservation server among types of received information, the travel reservation server may instruct the user terminal 10 to transmit the information of such a type as the deficiency information.

Specifically, in the travel reservation server 40, a flag is attached to information of the type which is not possible to be acquired by the travel reservation server or is not required to be handled among kinds of user information, and the information having a flag attached thereto is stored. For example, it can be determined that information is information of the type which is not possible to be acquired by the travel reservation server or is not required to be handled, by attaching a flag to credit card information and information of a bank account number in the user information.

Therefore, in a case where the travel reservation server receives information regarding the type of information required for performing the reservation processing from the reservation server such as the hotel-A reservation server 61, the hotel-B reservation server 62, and the flight ticket reservation server 63, the deficiency-information specifying unit 33 can specify the information of the type having a flag attached thereto as the deficiency information, without searching for information which is in the travel reservation server or is acquired from the SNS server 50.

As described above, the user information of a user is stored in the SNS server 50. Thus, in a case where the travel reservation server receives a reservation request from the user terminal 10, the travel reservation server 40 instructs the user terminal 10 to transmit information which is not held in the travel reservation server and is not possible to be acquired from the SNS server 50 among pieces of information required for performing the received reservation request, as the deficiency information.

In the following descriptions, a case where deficiency information as a target of an instruction to be transmitted from the travel reservation server 40 to the user terminal 10 is individual information of a user, for example, credit card information of a credit card number and the like will be described.

Figure 4:
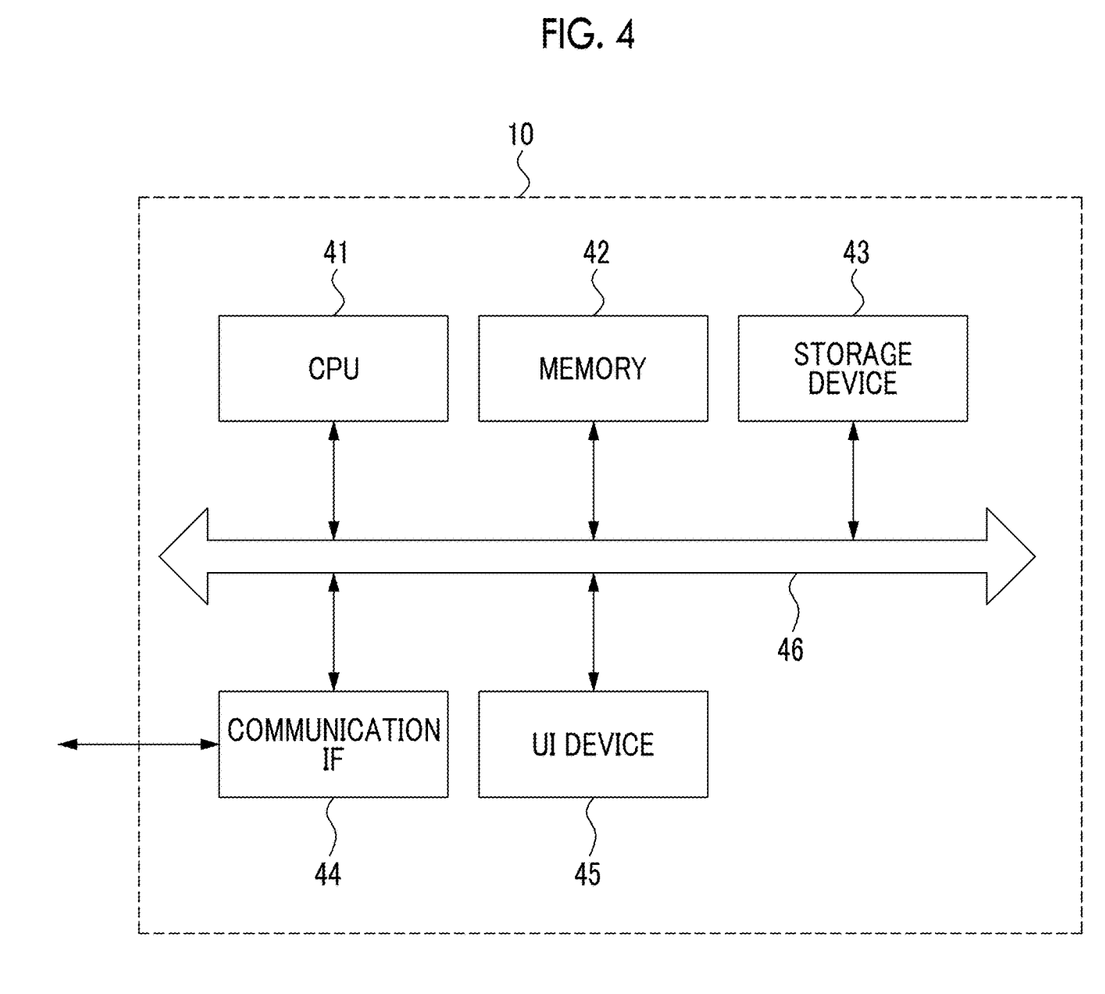
FIG. 4 is a block diagram illustrating a hardware configuration of a user terminal 10 in the exemplary embodiment of the present invention.

Next, FIG. 4 illustrates a hardware configuration of the user terminal 10 in the exemplary embodiment.

As illustrated in FIG. 4, the user terminal 10 includes a CPU 41, a memory 42, a storage device 43 such as a flash memory, a communication interface (IF) 44, and a user interface (UI) device 45 such as a touch panel or a liquid crystal display. The communication IF transmits and receives data to and from an external device and the like via the Internet 30. The components are connected to each other via a control bus 46.

The CPU 41 performs predetermined processing based on a control program stored in the memory 42 or the storage device 43 so as to control an operation of the user terminal 10. In the exemplary embodiment, descriptions will be made on the assumption that the CPU 41 reads and executes the control program stored in the memory 42 or the storage device 43. However, the control program may be downloaded as an application program and may be provided to the CPU 41.

Figure 5:
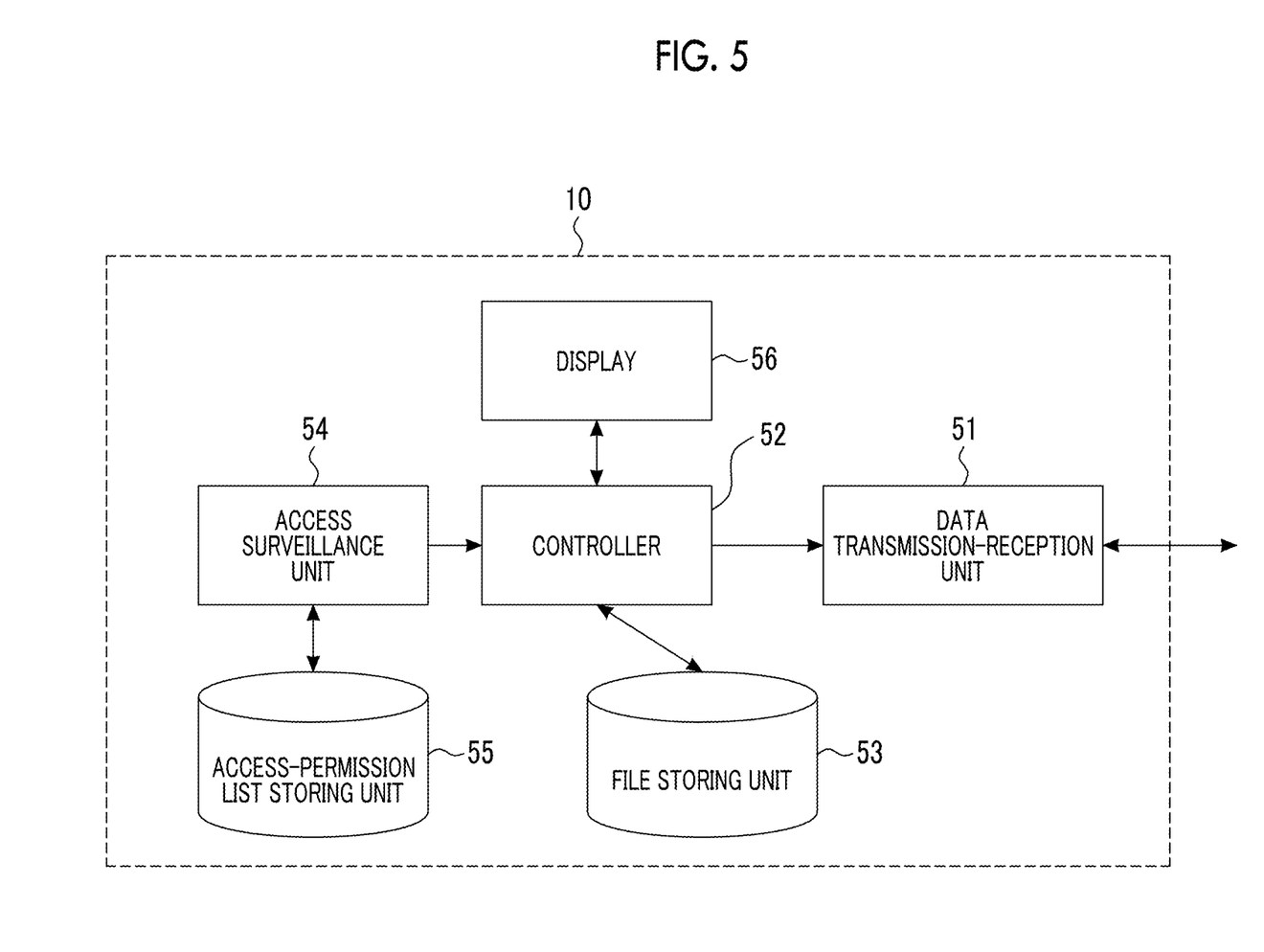
FIG. 5 is a block diagram illustrating a functional configuration of the user terminal 10 in the exemplary embodiment of the present invention.

FIG. 5 is a block diagram illustrating a functional configuration of the user terminal 10, which is realized by executing the control program.

As illustrated in FIG. 5, the user terminal 10 in the exemplary embodiment includes a data transmission-reception unit 51, a control unit 52, a file storing unit 53, an access surveillance unit 54, an access-permission list storing unit 55, and a display unit 56.

The data transmission-reception unit 51 transmits and receives data to and from other devices such as the travel reservation server 40, the SNS server 50, the hotel-A reservation server 61, the hotel-B reservation server 62, and the flight ticket reservation server 63.

The file storing unit 53 stores various kinds of file information. The display unit 56 performs various displays for a user. A touch panel is configured with the display unit 56 and an operation input unit (not illustrated).

The access surveillance unit 54 surveils which file the processing program transmitted from the external device like the reservation processing program transmitted from the travel reservation server 40 attempts to access in the user terminal, or surveils which information and transmission destination the processing program attempts to transmit.

The access-permission list storing unit 55 stores an access permission list (list information) in which information of a storage place of a file, which has a permission of being accessed by the external processing program or list information including transmission destinations having a permission of transmitting information to an external device is provided.

In a case where a transmission destination set to transmit information by executing the reservation processing program is not included in the access permission list stored in the access-permission list storing unit 55, the control unit 52 notifies a user of a message indicating that the transmission destination set to transmit information is not included in the access permission list, via the display unit 56 and the like.

Next, an operation of the travel reservation system in the exemplary embodiment will be described in detail with reference to the drawings.

Figure 6:
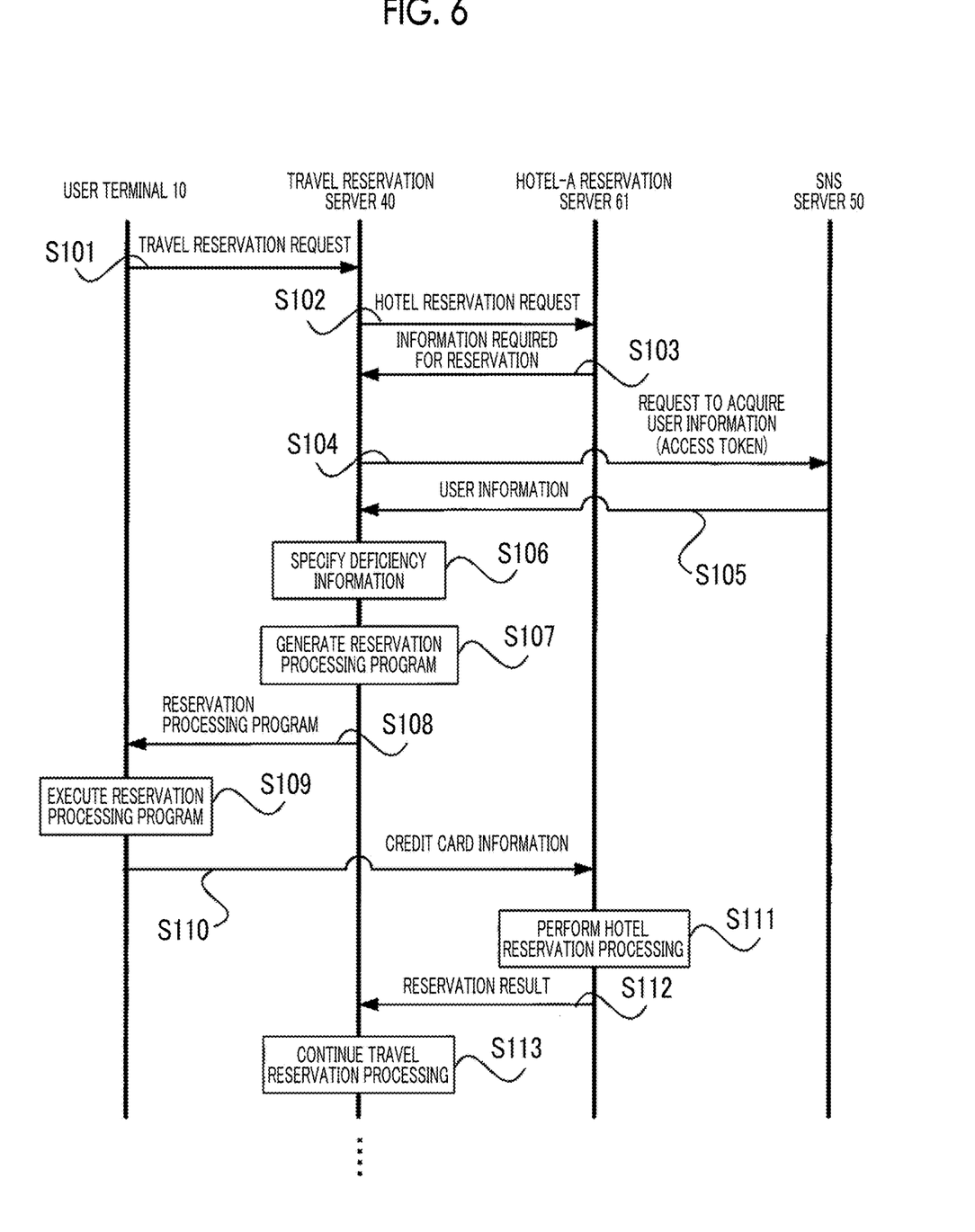
FIG. 6 is a sequence chart illustrating an operation in a case where a travel reservation request including a reservation for Hotel A is transmitted to the travel reservation server 40 from the user terminal 10.

Firstly, an operation in a case where a travel reservation request including a reservation of Hotel A is transmitted to the travel reservation server 40 from the user terminal 10 will be described with reference to the sequence chart in FIG. 6.

Firstly, a travel reservation request is transmitted to the travel reservation server 40 from the user terminal 10 (Step S101). Since the received travel reservation request includes a reservation of Hotel A, in a case where the travel reservation request is transmitted, the travel reservation server 40 transmits a hotel reservation request of requesting a reservation of Hotel A to the hotel-A reservation server 61 (Step S102).

In a case where the hotel reservation request is transmitted, the hotel-A reservation server 61 receives the hotel reservation request from the travel reservation server 40 and notifies the travel reservation server 40 of information required for the reservation of Hotel A, for example, information such as the name, the address, the contact point, credit card information of the reserver (Step S103).

Here, in a case where the travel reservation server receives the travel reservation request from the user terminal 10, the travel reservation server 40 receives an access token to the SNS server 50. Thus, the travel reservation server transmits a request of acquiring user information of the user to the SNS server 50 (Step S104) by using the access token.

In a case where the request of acquiring user information is transmitted, the SNS server 50 checks the access token received from the travel reservation server 40, and then transmits the user information of the user to the travel reservation server 40 as a response (Step S105).

The travel reservation server 40 compares the type of information of which a notification is performed from the hotel-A reservation server 61 and which is required for the reservation processing, to user information held in the travel reservation server and user information transmitted from the SNS server 50. As a result, the travel reservation server specifies deficiency information which is not possible to be acquired by the travel reservation server among pieces of information required for performing the reservation processing of Hotel A (Step S106).

In a case where the travel reservation server specifies deficiency information, the travel reservation server 40 obtains the deficiency information and generates a reservation processing program of transmitting the obtained deficiency information to the hotel-A reservation server 61 (Step S107), and transmits the reservation processing program to the user terminal 10 (Step S108).

The user terminal 10 which receives the reservation processing program from the travel reservation server 40 executes the reservation processing program (Step S109).

In a case where the travel reservation server executes the reservation processing program, the user terminal acquires credit card information which has been input by an operation of the user or has been registered in advance, and transmits the acquired credit card information to the hotel-A reservation server 61, by the user terminal 10 executing the reservation processing program (Step S110).

The hotel-A reservation server 61 performs payment of the rate of using Hotel A so as to perform the reservation processing of the hotel by using the credit card information transmitted from the user terminal 10 (Step S111). Then, the hotel-A reservation server transmits a reservation result to the travel reservation server 40 (Step S112).

In a case where the hotel-A reservation server transmits a reservation result, the travel reservation server 40 recognizes that the reservation processing of Hotel A is safely completed, and continues travel reservation processing from the user terminal 10 (Step S113). For example, the travel reservation server 40 sequentially performs reservation processing of the reservation of Hotel B, the reservation of a flight ticket, and the like which are next to the reservation of Hotel A, by a method similar to that of the reservation processing of Hotel A, which has been described above.

Next, an overview of information transmitted and received between the user terminal 10, the travel reservation server 40, the hotel-A reservation server 61, and the SNS server 50 by processing illustrated in FIG. 6 will be described with reference to FIG. 7.

(1) Firstly, a travel reservation request including a reservation request of Hotel A is transmitted to the travel reservation server 40 from the user terminal 10.

(2) In a case where the travel reservation request is transmitted, the travel reservation server 40 transmits a hotel reservation request of requesting a reservation of Hotel A to the hotel-A reservation server 61.

(3) Then, the hotel-A reservation server 61 notifies the travel reservation server 40 of information required for the reservation of Hotel A, for example, information such as the name, the address, the contact point, credit card information of the reserver.

(4) Then, the travel reservation server 40 transmits a request of acquiring user information of a user to the SNS server 50 by using an access token which has been received from the user terminal 10 in advance.

(5) In a case where the travel reservation server transmits the request of acquiring user information, the SNS server 50 transmits user information held for the user to the travel reservation server 40 as a response.

(6) The travel reservation server 40 generates a reservation processing program including information of a transmission destination of credit card information and transmits the generated reservation processing program to the user terminal 10.

(7) As a result, the user terminal 10 executes the reservation processing program so as to transmit the credit card information to the hotel-A reservation server 61 as the designated transmission destination.

Figure 7:
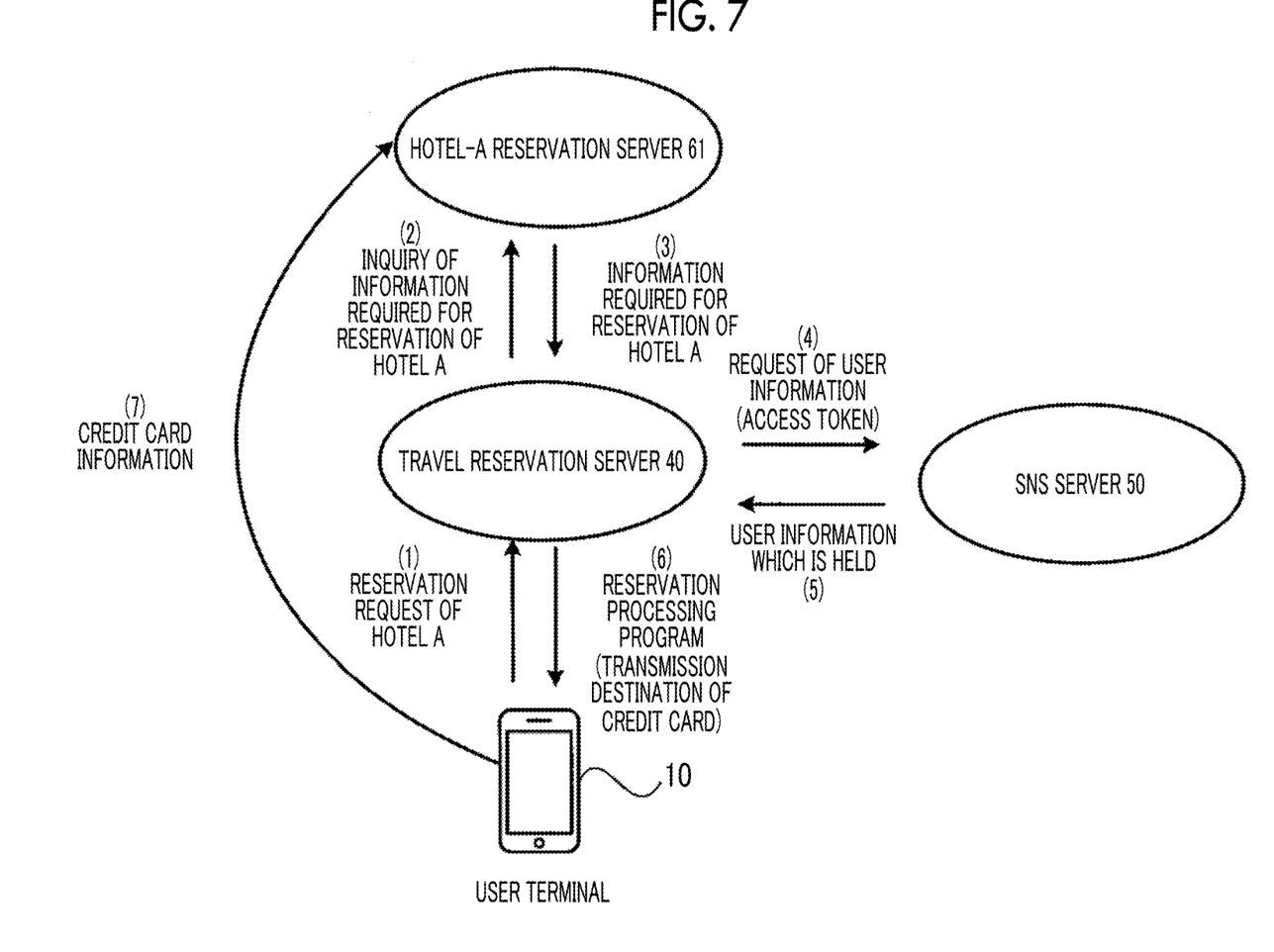
FIG. 7 is a diagram illustrating an overview of information transmitted and received between the user terminal 10, the travel reservation server 40, a hotel-A reservation server 61, and an SNS server 50, by processing illustrated in FIG. 6.

With reference to FIG. 7, it is understood that the credit card information of the user of the user terminal 10 is transmitted to the hotel-A reservation server 61 without passing through the travel reservation server 10.

In the user terminal 10 in the exemplary embodiment, the credit card information is transmitted to the transmission destination which has been preset in the reservation processing program, by executing the reservation processing program.

Figure 8:
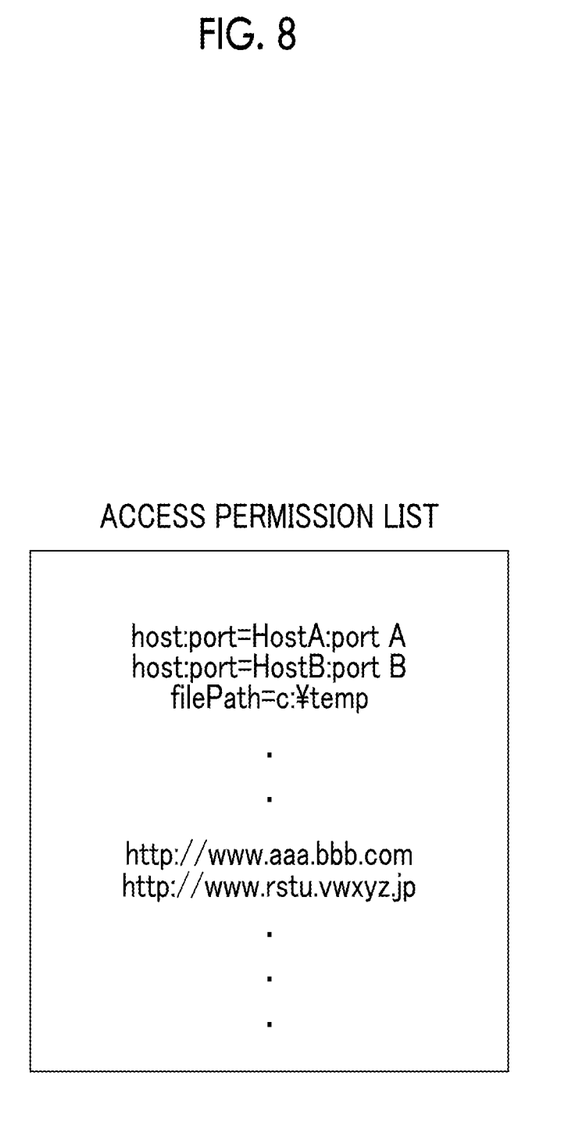
FIG. 8 is a diagram illustrating an example of an access permission list stored in the access-permission list storing unit 55.

Therefore, for example, the access permission list as illustrated in FIG. 8 is stored in the user terminal 10. Thus, in the user terminal 10, an occurrence of a situation in which the executed reservation processing program accesses a storage place which is not described in the access permission list or a situation in which information is involuntarily transmitted to a transmission destination which is not described in the access permission list is not possible.

Figure 9:
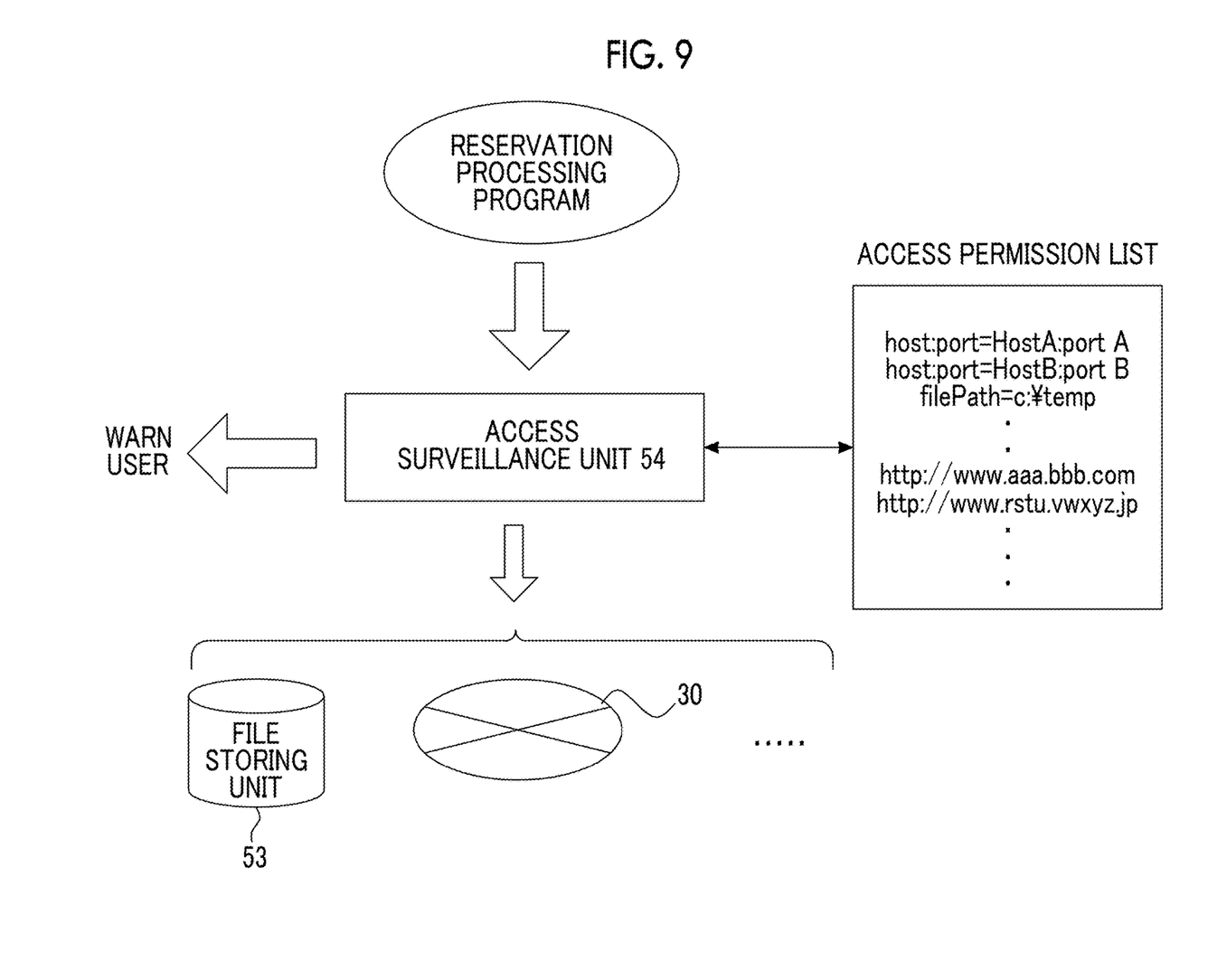
FIG. 9 is a diagram illustrating a form in which an access surveillance unit 54 surveils an access destination of a reservation processing program and a transmission destination of information.

Specifically, as illustrated in FIG. 9, in the user terminal 10, the access surveillance unit 54 surveils which file the reservation processing program attempts to access in the file storing unit 53, to which transmission destination the reservation processing program attempts to transmit information via the Internet 30, or which process the reservation processing program attempts to access on the user terminal 10.

In a case where the reservation processing program attempts to access an access destination which is not described in the access permission list or attempts to transmit information such as credit card information to a transmission destination which is not described in the access permission list, the access surveillance unit 54 notifies the user of a message indicating such an attempt by warning.

Figure 10:
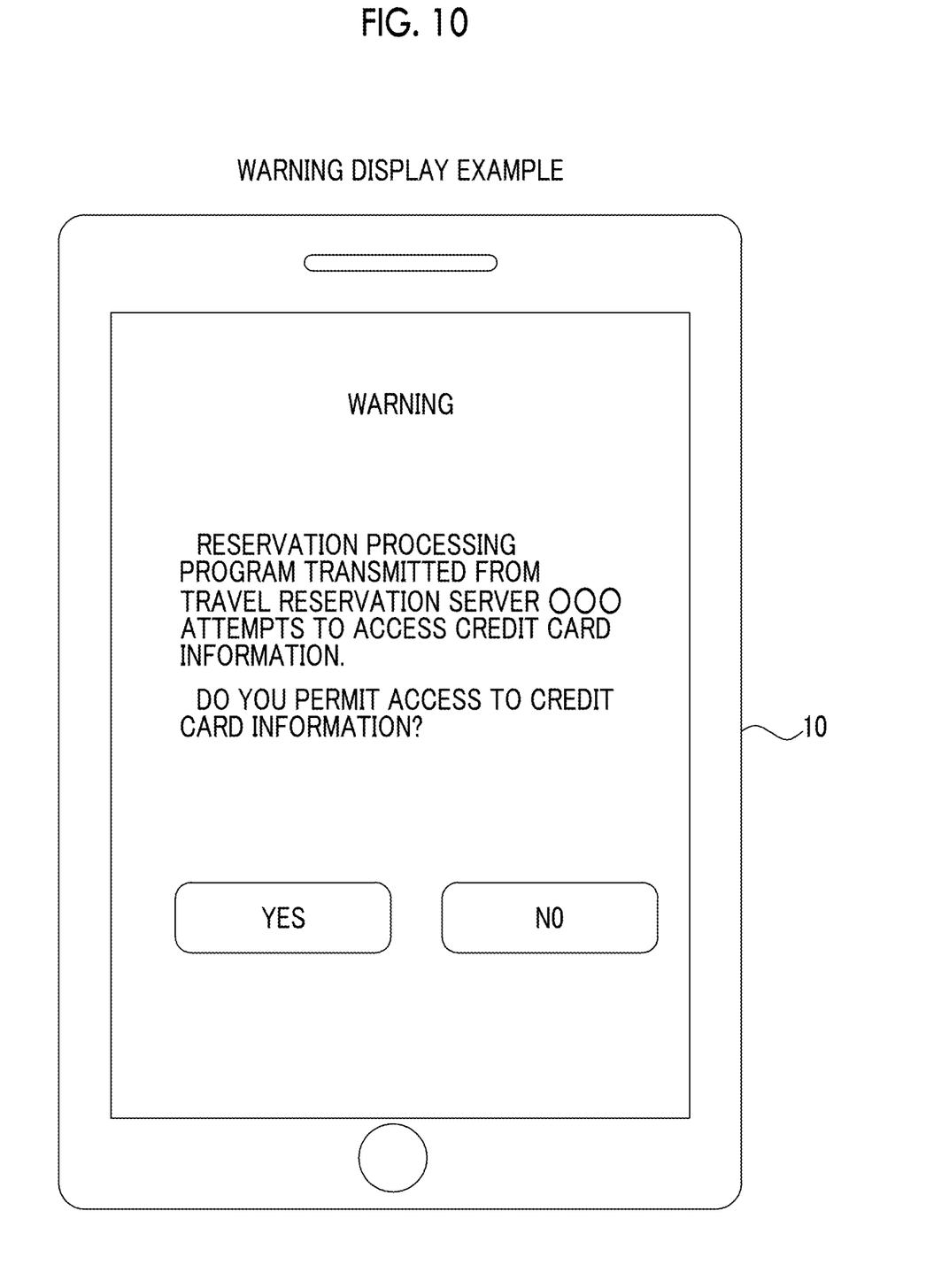
FIG. 10 is a diagram illustrating a warning display example displayed in a case where the reservation processing program attempts to access credit card information stored in a storage place which is not described in the access permission list.
Figure 11:
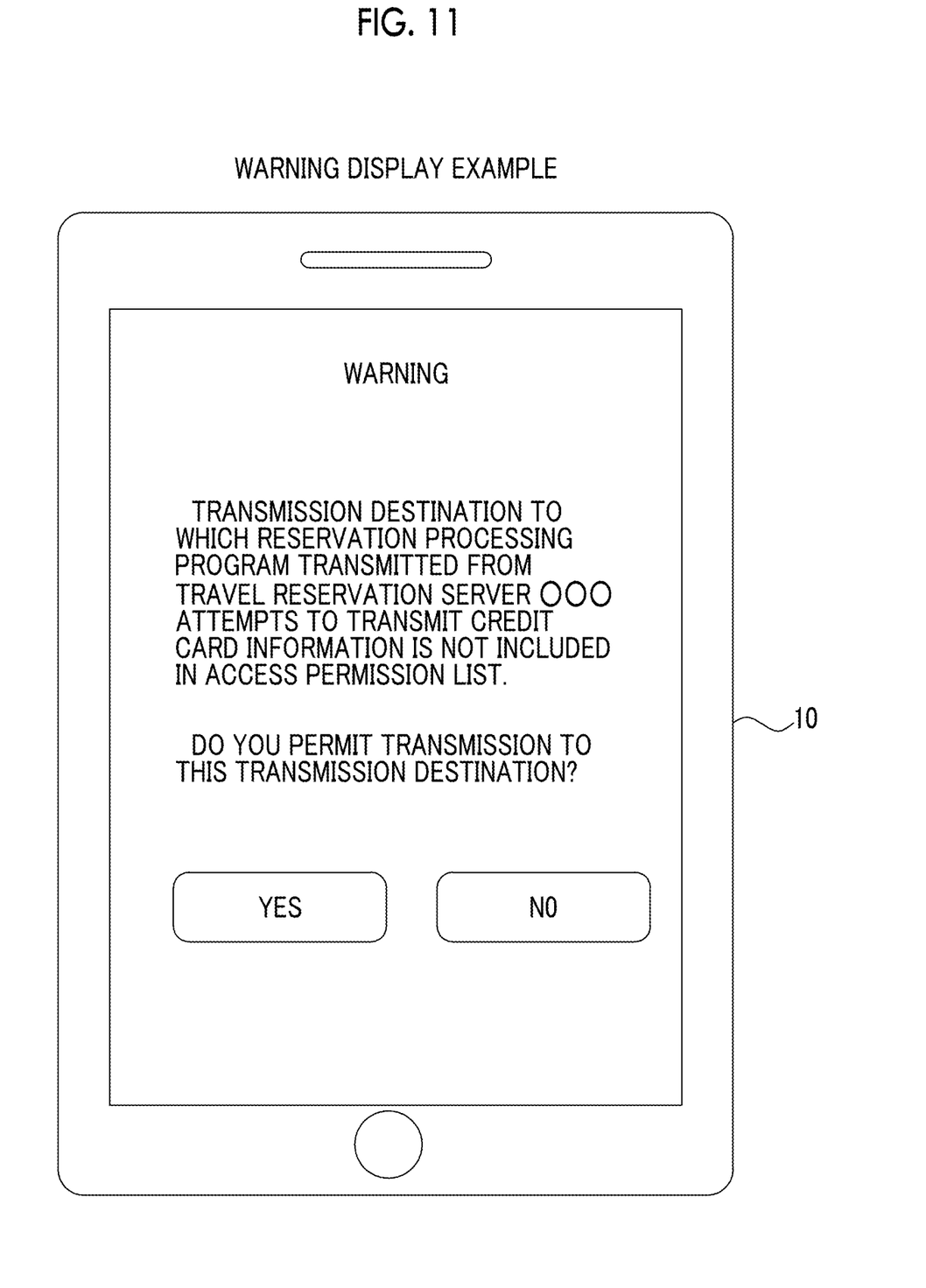
FIG. 11 is a diagram illustrating a warning display example displayed in a case where the reservation processing program attempts to transmit the credit card information to a transmission destination which is not described in the access permission list.

FIGS. 10 and 11 illustrate warning display examples by such an access surveillance unit 54.

FIG. 10 illustrates a warning display example displayed in a case where the reservation processing program attempts to access credit card information stored in a storage place which is not described in the access permission list.

FIG. 11 illustrates a warning display example displayed in a case where the reservation processing program attempts to transmit the credit card information to a transmission destination which is not described in the access permission list.

In FIGS. 10 and 11, in a case where the user touches "YES" on a warning display screen, an access to the credit card information by the reservation processing program is permitted, or transmission of the credit card information by the reservation processing program is permitted. In a case where the user touches "NO" on the warning display screen, the access to the credit card information by the reservation processing program is prohibited, or the transmission of the credit card information by the reservation processing program is prohibited.

Modification Example

In the exemplary embodiment, a case where individual information of a user, which is not disclosed to the counterpart having low reliability like the travel reservation server 40 is the credit card information is described. However, the present invention is not limited thereto. Even in a case where such individual information is a personal identification number, a license number, a passport number, an annuity number, a bank account number, or the like, the present invention can be similarly applied.

In the exemplary embodiment, the travel reservation processing in which a processing request from the user terminal 10 includes a reservation of a hotel or a flight ticket is described. However, the present invention is not limited to such a case. For example, the present invention can be similarly applied even in a case where a processing request from the user terminal 10 is a reservation request other than a travel reservation, the processing request is a request for application of using a certain service, or the processing request is a request for purchasing, for example, commodities or various tickets.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a plurality of information processing apparatuses that perform a plurality of received processing requests;
a relay device comprising a processor configured to control a communication interface that relays the plurality of processing requests performed by the plurality of information processing apparatuses; and
a user terminal that transmits the plurality of processing requests to the relay device,
wherein the relay device transmits each of the plurality of received processing requests to a corresponding information processing apparatus capable of performing the processing request in a case of receiving the plurality of processing requests from the user terminal, and designates a plurality of transmission destinations of deficiency information and transmits the plurality of designated transmission destinations to the user terminal in a case where there is the deficiency information which is not possible to be acquired in the relay device among pieces of information required for performing the plurality of processing requests, and
the user terminal transmits the deficiency information to the corresponding information processing apparatus according to each of the plurality of transmission destinations designated by the relay device,
wherein the relay device designates the plurality of transmission destinations of the deficiency information by transmitting a processing program of acquiring the deficiency information and causing the plurality of information processing apparatuses to perform the plurality of processing requests to the user terminal, wherein the user terminal includes
- a storing device that stores list information in which the plurality of transmission destinations having a permission of transmitting information is registered in advance, and
- a controller that via a display panel notifies a user of a message indicating that the plurality of transmission destinations are not included in the list information, in a case where the plurality of transmission destinations to which information attempts to be transmitted by the processing program being executed are not included in the list information stored in the storing device, wherein in a case where the processing program attempts to access the plurality of transmission destinations which is not described in the access permission list, the controller notifies the user of the message indicating such an attempt by warning, wherein the user executes or prohibits the processing program by selecting the plurality of options provided on the display panel.

2. The information processing system according to claim 1,
wherein, in a case where the relay device transmits the plurality of processing requests from the user terminal to the plurality of information processing apparatuses, the relay device receives information regarding a type of information required for performing the plurality of processing requests from the plurality of information processing apparatuses and instructs the user terminal to transmit information of a type which is not possible to be acquired in the relay device among types of received information, as the deficiency information.

3. The information processing system according to claim 2,
wherein the relay device stores the type of information which is not possible to be acquired in the relay device, in advance, and
the relay device instructs the user terminal to transmit information as the deficiency information in a case where the relay device receives information regarding the type of information required for performing the plurality of processing requests from the plurality of information processing apparatuses, and there is the information of the type which is not possible to be acquired in the relay device among the types of the received information.

4. The information processing system according to claim 3, further comprising:
an information storing device that stores information regarding a user,
wherein, in a case where the relay device receives the plurality of processing requests from the user terminal, the relay device instructs the user terminal to transmit information which is not held in the relay device and is not possible to be acquired from the information storing device among pieces of information required for performing the plurality of received processing requests, as the deficiency information.

5. The information processing system according to claim 4,
wherein the deficiency information is individual information of a user.

6. The information processing system according to claim 3,
wherein the deficiency information is individual information of a user.

7. The information processing system according to claim 3,
wherein the relay device designates the plurality of transmission destinations of the deficiency information by transmitting a processing program of acquiring the deficiency information and causing the plurality of information processing apparatuses to perform the plurality of processing requests to the user terminal.

8. The information processing system according to claim 2, further comprising:
an information storing device that stores information regarding a user,
wherein, in a case where the relay device receives the plurality of processing requests from the user terminal, the relay device instructs the user terminal to transmit information which is not held in the relay device and is not possible to be acquired from the information storing device among pieces of information required for performing the plurality of received processing requests, as the deficiency information.

9. The information processing system according to claim 8,
wherein the deficiency information is individual information of a user.

10. The information processing system according to claim 2,
wherein the deficiency information is individual information of a user.

11. The information processing system according to claim 2,
wherein the relay device designates the plurality of transmission destinations of the deficiency information by transmitting a processing program of acquiring the deficiency information and causing the plurality of information processing apparatuses to perform the plurality of processing requests to the user terminal.

12. The information processing system according to claim 1, further comprising:
an information storing device that stores information regarding a user,
wherein, in a case where the relay device receives the plurality of processing requests from the user terminal, the relay device instructs the user terminal to transmit information which is not held in the relay device and is not possible to be acquired from the information storing device among pieces of information required for performing the plurality of received processing requests, as the deficiency information.

13. The information processing system according to claim 12,
wherein the deficiency information is individual information of a user.

14. The information processing system according to claim 12,
wherein the relay device designates the plurality of transmission destinations of the deficiency information by transmitting a processing program of acquiring the deficiency information and causing the plurality of information processing apparatuses to perform the plurality of processing requests to the user terminal.

15. The information processing system according to claim 1,
   wherein the deficiency information is individual information of a user.

16. The information processing system according to claim 1,
   wherein the processing program acquires the deficiency information and transmits the acquired deficiency information to a preset transmission destination, by being executed in the user terminal.

17. A relay device comprising:
   a processor configured to
   control a communication interface to transmit each of a plurality of received processing requests to a corresponding information processing apparatus capable of performing the processing request, in a case where the plurality of processing requests have been received from a user terminal; and
   designate a plurality of transmission destinations of deficiency information and control the communication interface to transmit the plurality of designated transmission destinations to the user terminal, in a case where there is the deficiency information which is not possible to be acquired in the relay device among pieces of information required for performing the plurality of processing requests, and
   the user terminal transmits the deficiency information to the corresponding information processing apparatus according to each of the plurality of transmission destinations designated by the relay device,
   wherein the relay device designates the plurality of transmission destinations of the deficiency information by transmitting a processing program of acquiring the deficiency information and causing the plurality of information processing apparatuses to perform the plurality of processing requests to the user terminal,
   wherein the user terminal includes
      a storing device that stores list information in which the plurality of transmission destinations having a permission of transmitting information is registered in advance, and
      a controller that via a display panel notifies a user of a message indicating that the plurality of transmission destinations are not included in the list information, in a case where the plurality of transmission destinations to which information attempts to be transmitted by the processing program being executed are not included in the list information stored in the storing device,
   wherein in a case where the processing program attempts to access the plurality of transmission destinations which is not described in the access permission list, the controller notifies the user of the message indicating such an attempt by warning, wherein the user executes or prohibits the processing program by selecting the plurality of options provided on the display panel.

18. A non-transitory computer readable medium storing a program causing a computer to execute:
   transmitting each of a plurality of received processing requests to a corresponding information processing apparatus capable of performing the processing request, in a case where the plurality of processing requests have been received from a user terminal; and
   designating a plurality of transmission destinations of deficiency information and transmitting the plurality of designated transmission destinations to the user terminal, in a case where there is the deficiency information which is not possible to be acquired in the computer among pieces of information required for performing the plurality of processing requests, and
   the user terminal transmits the deficiency information to the corresponding information processing apparatus according to each of the plurality of transmission destinations designated by the relay device,
   wherein the relay device designates the plurality of transmission destinations of the deficiency information by transmitting a processing program of acquiring the deficiency information and causing the plurality of information processing apparatuses to perform the plurality of processing requests to the user terminal,
   wherein the user terminal includes a storing device and a controller, the user terminal:
      storing list information in which the plurality of transmission destinations having a permission of transmitting information is registered in advance in the storing device, and
      notifying a user of a message indicating that the plurality of transmission destinations are not included in the list information by the controller via a display panel, in a case where the plurality of transmission destinations to which information attempts to be transmitted by the processing program being executed are not included in the list information stored in the storing device,
   wherein in a case where the processing program attempts to access the plurality of transmission destinations which is not described in the access permission list, the controller notifies the user of the message indicating such an attempt by warning, wherein the user executes or prohibits the processing program by selecting the plurality of options provided on the display panel.

* * * * *